Patented Jan. 1, 1924.

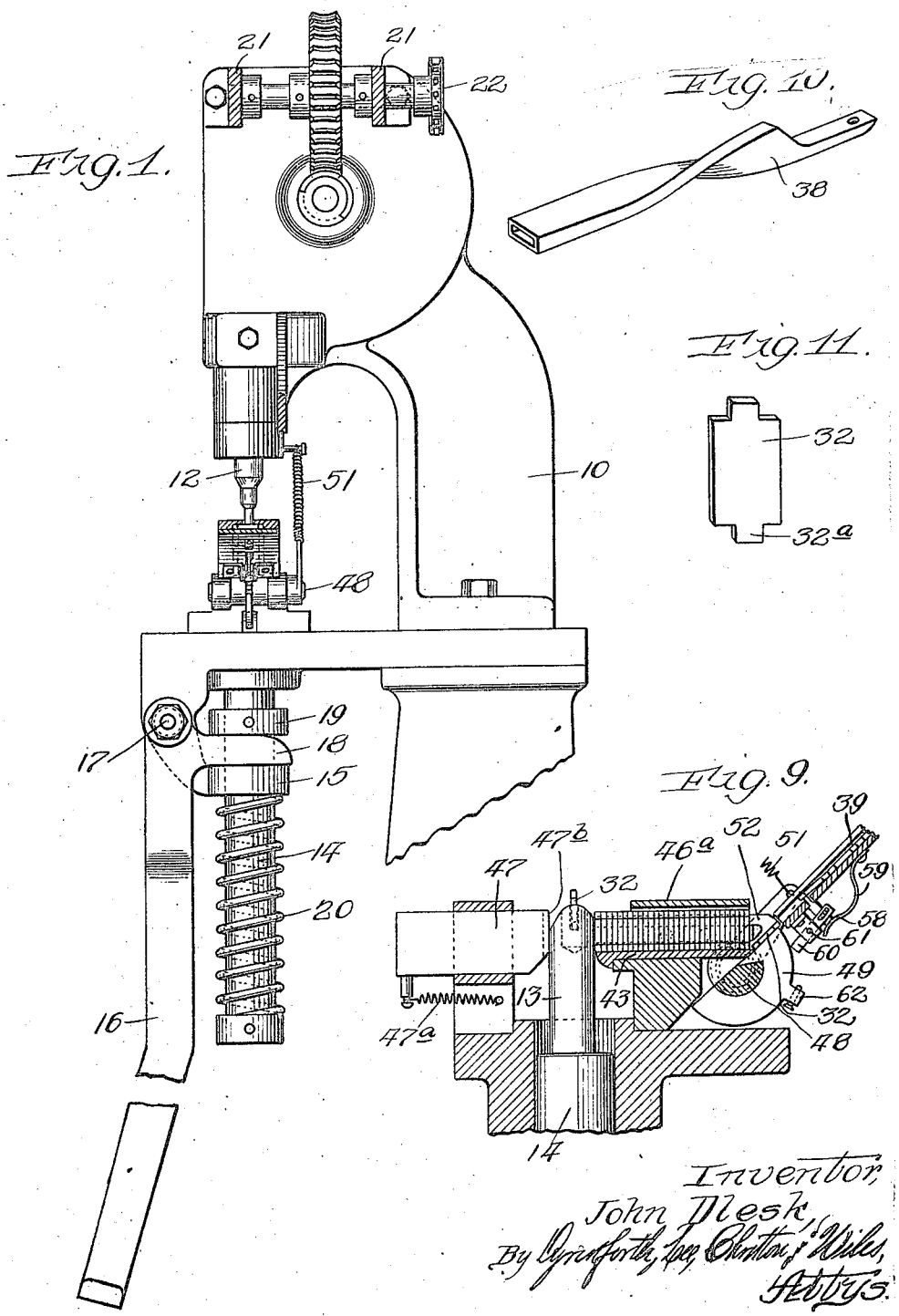

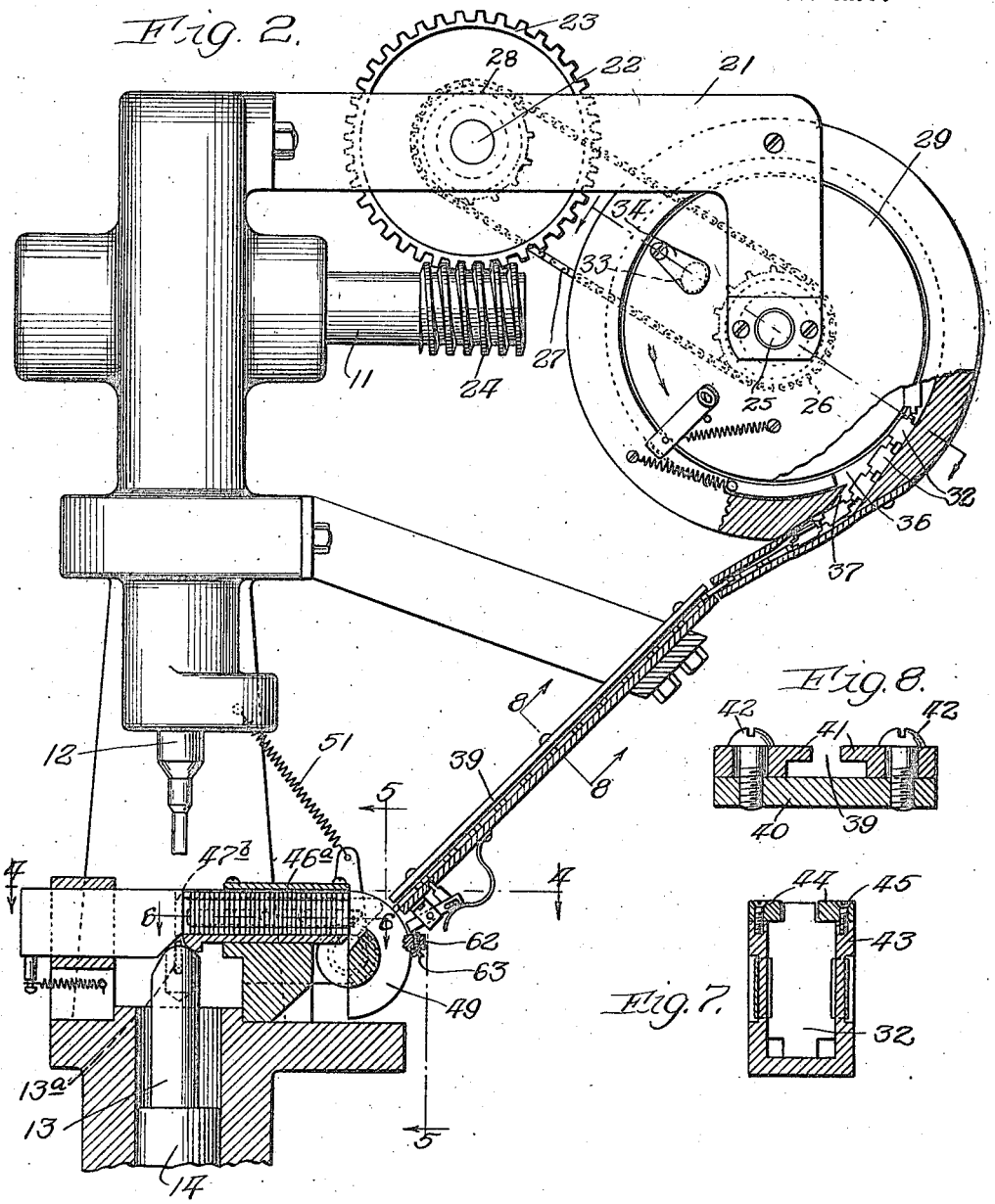

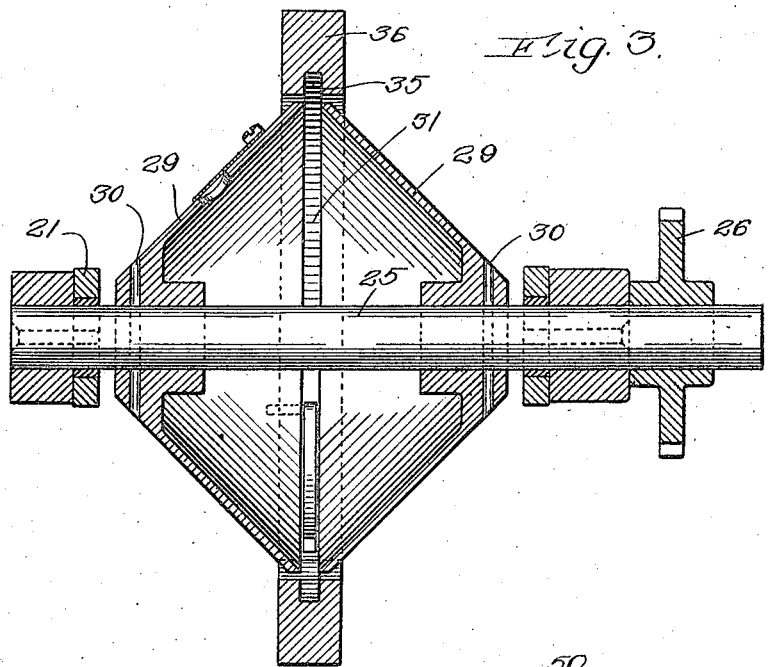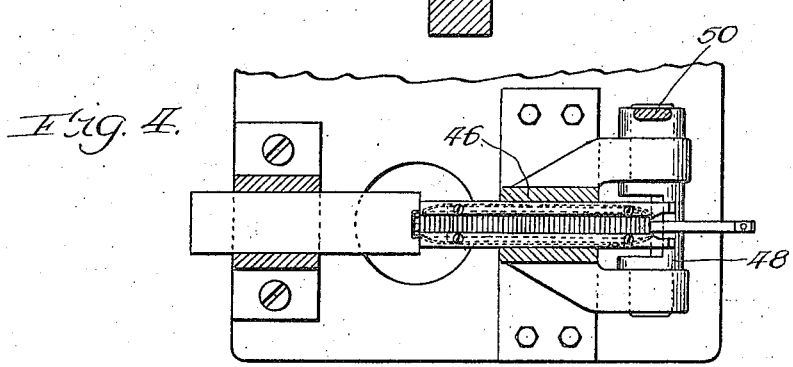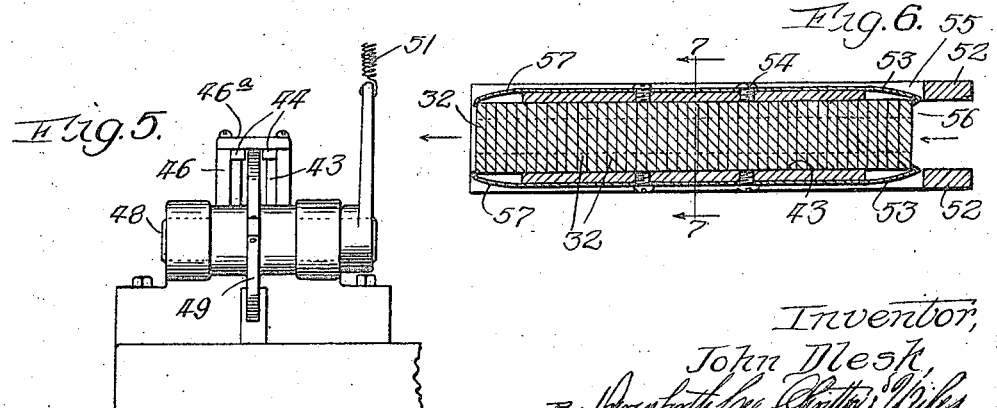

1,479,060

UNITED STATES PATENT OFFICE.

JOHN DLESK, OF BERWYN, ILLINOIS, ASSIGNOR TO U. S. BALL BEARING MANUFACTURING COMPANY, OF CHICAGO, ILLINOIS, A CORPORATION OF ILLINOIS.

FEEDING MECHANISM.

Application filed April 6, 1922. Serial No. 550,235.

*To all whom it may concern:*

Be it known that I, JOHN DLESK, a citizen of the United States, residing at Berwyn, in the county of Cook and State of Illinois, have invented a new and useful Improvement in Feeding Mechanism, of which the the following is a specification.

This invention relates to mechanism for feeding rivets to a riveting machine, or the like, and is fully described in the following specification and shown in the accompanying drawings, in which:

Figure 1 is a side elevation of a riveting machine with my feeding mechanism applied thereto;

Fig. 2 is a front elevation of the same showing the feeding mechanism in section;

Fig. 3 is a longitudinal section on the line 3—3 of Fig. 2;

Fig. 4 is a horizontal section on the line 4—4 of Fig. 2;

Fig. 5 is a partial side elevation on the broken line 5—5 of Fig. 2;

Fig. 6 is a horizontal section on the line 6—6 of Fig. 2;

Fig. 7 is a vertical section on the line 7—7 of Fig. 6;

Fig. 8 is a section on the line 8—8 of Fig. 2;

Fig. 9 is a partial vertical section through the feeding magazine similar to that shown in Fig. 2 but showing the rivet anvil raised;

Fig. 10 is a perspective view of the upper end of the chute shown in Fig. 1; and Fig. 11 is an enlarged perspective view of a rivet such as may be handled by this mechanism.

This feeding mechanism is applied to the riveting machine of a well known type having a frame 10 which carries a driving shaft 11. This shaft operates a mechanism (not shown) to cause the hammer 12 to vibrate rapidly in a well known manner when a rivet or the like is forced up under this hammer from beneath. The above mechanism forms no part of the present invention and consequently is not illustrated.

The anvil 13 is carried by a rod 14 as shown in Figures 1 and 2 and is normally held in a low position by means of the stop 15 carried by the frame 10. An operating lever 16 is hingedly mounted upon the pin 17 and has a bifurcated lug 18 surrounding the rod 14 and acting upon the collar 19 which is secured to this rod. A spring 20 serves to maintain these parts in the lowermost position as shown in Fig. 1.

The upper part of the frame carries spaced arms 21 in which is journalled a shaft 22. A worm wheel 23 keyed on this shaft meshes with a worm 24 on the shaft 11.

The arms 21 have bearings formed in their depending lower ends in which is journalled a shaft 25 carrying a sprocket wheel 26 which is driven by means of a chain 27 from the sprocket wheel 28 on the shaft 22. Facing conical drum elements 29 are secured to the shaft 25 by means of pins 30 or the like, so that a uniform annular space 21 is left between these drums at their periphery. This space is only slightly wider than the thickness of the rivets 32, one of which is shown in Figure 11, so that the rivets may pass edgewise through this opening.

Rivets are placed in this drum through the opening 33 which is normally closed by the spring cover 34. As the drum 29 is rotated in a counter-clockwise direction as shown in Figure 2, the rivets 32 pass out through the opening 31 into the annular groove 35 in the ring 36 and out through the passage 37. As this feeding mechanism forms no part of the present invention, it is not described in detail, but is described and claimed in a co-pending application, Serial No. 550,236, filed April 6, 1922.

As the rivets leave this feeding drum through the passage 37 they pass through the spiral tube 38, which is shown in Fig. 10, and thence down through the chute 39, a cross section of which is shown in Figure 8. This chute consists of a back 40 to which shouldered plates 41 are secured by means of screws 42. The width and thickness of the chute 39 are such as to permit the rivets to be fed endwise therethrough.

A magazine, as shown in cross section in

Figures 6 and 7, consisting of a U-shaped channel 43 to the upper ends of which are secured longitudinal bars 44 by means of screws 45 is slidably mounted between the guide members 46 as shown in Figure 4 and retained by a cover plate 46ᵃ which is secured to the guide members.

A sliding block 47 is slidably mounted directly opposite the magazine and the adjacent lower ends of both the magazine and block 47 are beveled so as to cause them to slide apart when acted upon by the beveled upper end of the anvil 13 as shown in Figure 9.

A shaft 48 is journalled beneath the magazine and transversely thereto and has a semi-cylindrical disk 49 formed thereon, the straight face of which normally stands vertically as shown in Figure 2 in contact with the lower edge of the magazine chamber 43. An arm 50 keyed to this shaft has a spring 51 acting thereon which tends to maintain the parts in position, as shown in Figure 2. An ear 52 is formed in each side of the magazine by extending its sides.

The method of operation of the magazine feeding mechanism is as follows:

The operator pushes the operating lever 16 forward with his foot thereby raising the plunger 14 and the anvil 13 against the action of the spring 20. As the anvil 13 is raised the beveled upper end thereof pushes the magazine 43 and the block 47 to the right and left respectively, as shown in Figure 9. As the magazine moves to the right, the bottom being in contact with the semi-cylindrical member 49, it rocks this member about the axis of the shaft 48 in a clock-wise direction until it uncovers the lower end of the chute 39. This chute is filled with rivets which, up to this time, have been retained by the circular face of the member 49. As the end of the chute is uncovered, the lowermost rivet drops upon the upper portion of the straight face of the member 49 and is retained thereon by the bottom of the magazine 43 and the ears 52.

When the plunger is again lowered by removing the pressure upon the operating lever 16, the block 47 is returned to its normal position as shown in Figure 2 by the action of the spring 47ᵃ and the magazine 43 is likewise returned to the position shown in Figure 2 by the action of the spring 51. At the same time the semi-cylindrical member 49 is rocked back to its normal position as shown in Figure 2 thereby forcing forward into the magazine the last rivet 32 which has just been delivered by the chute 39.

Spring clips 53 are secured to the sides of the magazine 43 by means of screws 54 and extend through openings 55 in the sides of the magazine. These are provided with spurs 56 which permit rivets to be fed into the magazine from the right but prevent them from being withdrawn except through the opposite end. These spring clips terminate at the opposite end of the magazine in fingers 57 which yieldingly hold the rivets in the magazine until they are forced therefrom by each new rivet as it is inserted from the right-hand end.

The block 47 has a vertical slot 47ᵇ of the width of a rivet so that as each rivet is forced from the magazine, it slides vertically down this slot until the reduced lower end 32ᵃ of the rivet drops into a slot 13ᵃ in the upper end of the anvil which is formed to receive it. When the anvil 13 is again raised, this rivet will be carried up as shown in Figure 9, until it is forced against the rivet hammer 12 and riveted over.

In order to prevent the other rivets from descending through the chute 39 when the lowermost rivet drops upon the member 49, I have provided a pin 58 which extends through an opening in the side of the chute and a spring 59 which tends to press this pin inwardly. The lever 60 is pivotally mounted at 61, the upper end of the lever being pivotally connected to the pin 58 while the lower end lies in the path of the lug 62, which is formed on the outer face of the semi-cylindrical member 49. A screw 63 is provided for adjusting the operation of this holding device.

It will be understood from the foregoing that when the member 48 is in the position shown in Figure 2, the pin 58 will be withdrawn, due to pressure of the screw 63 upon the lower end of the lever 60, thereby permitting rivets to slide freely down the chute 39 until the lowermost rests upon the outer cylindrical face of the member 49. When the member 49 is rocked back as shown in Figure 9, the screw 63 moves away from the lever 60, thereby permitting the spring 59 to force the pin 58 into contact with the next to the lowermost rivet, thereby retaining all of the rivets except the lowermost in the chute 39.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In a riveting machine, a longitudinally movable anvil, a magazine movable thereby, a chute through which rivets may be fed, and a movable member normally closing the end of said chute, said member being movable by said magazine to a position where said member uncovers the end of the chute and permits the rivet at the bottom of the chute to drop thereon, said member forcing said rivet into the magazine on the next forward actuation of said member.

2. In a riveting machine, a longitudinally movable anvil, a magazine movable thereby, a chute through which rivets may be fed, a movable member normally closing the end of said chute, said member being movable by said magazine to a position where said member uncovers the end of the chute and permits the rivet at the bottom of the chute to drop thereon, said member forcing said rivet into the magazine on the next forward actuation of said member, said magazine having means for yieldably retaining a certain number of rivets, so that as each rivet is forced into one end of the magazine a rivet is forced out the other end, and means for retaining said last-named rivet in riveting position with respect to said anvil.

3. In a riveting machine, a longitudinally movable anvil, a magazine movable thereby, a chute through which rivets may be fed, a movable member normally closing the end of said chute, said member being movable by said magazine to a position where said member uncovers the end of the chute and permits the rivet at the bottom of the chute to drop thereon, said member forcing said rivet into the magazine on the next forward actuation of said member, said magazine having means for yieldably retaining a certain number of rivets, so that as each rivet is forced into one end of the magazine a rivet is forced out the other end, a notch in the upper end of said anvil to hold a rivet and means for guiding a rivet from the end of said magazine into said notch.

4. In a riveting machine, a longitudinally movable anvil, a magazine movable at right angles thereto, means in the magazine for yieldably retaining a certain number of said rivets, means for feeding rivets one at a time to said magazine, and means for holding the last rivet forced out of said magazine in riveting position.

5. In a riveting machine, a longitudinally movable anvil, a magazine movable at right angles thereto, means in the magazine for yieldably retaining a certain number of said rivets, means operable by the movement of said anvil for feeding rivets one at a time to said magazine, and means for holding the last rivet forced out of said magazine in riveting position.

6. In a riveting machine, a longitudinally movable anvil, a magazine movable at right angles thereto, means in the magazine for yieldably retaining a certain number of said rivets, means for feeding rivets one at a time to said magazine, an opening in the end of said anvil and means for guiding into said opening, each rivet as it is forced out of the magazine.

7. In a riveting machine, a longitudinally movable anvil, a magazine movable at right angles thereto, means in the magazine for yieldably retaining a certain number of said rivets, means for feeding rivets one at a time to said magazine, a guide block opposite said magazine, means for normally yieldingly holding said block and the delivery end of the magazine in adjacent relation above said anvil, and means for moving said magazine and block as said anvil is raised.

8. In a riveting machine, a longitudinally movable anvil, a magazine movable at right angles thereto, means in the magazine for yieldably retaining a certain number of said rivets, means for feeding rivets one at a time to said magazine, a guide block opposite said magazine, means for normally yieldingly holding said block and the delivery end of the magazine in adjacent relation above said anvil, and beveled portions on said anvil, block and magazine, for separating the block and magazine as the anvil is raised.

9. Mechanism for feeding rivets and the like comprising a chute, a magazine adapted to hold a series of rivets in side by side relation, and a rocking member having a segment normally closing the lower end of said chute, said segment having a radial face oscillatable into alignment with said chute, so that the lowermost rivet in the chute will drop thereon, said member forcing said rivet into the magazine on the next forward oscillation.

10. Mechanism for feeding rivets and the like comprising a chute, a magazine adapted to hold a series of rivets in side by side relation, a rocking member having a segment normally closing the lower end of said chute, said segment having a radial face oscillatable into alignment with said chute, so that the lowermost rivet in the chute will drop thereon, said member forcing said rivet into the magazine on the next forward oscillation, and means in said magazine for holding a definite number of rivets therein.

11. Mechanism for feeding rivets and the like comprising a chute, a magazine adapted to hold a series of rivets in side by side relation, a rocking member having a segment normally closing the lower end of said chute, said segment having a radial face oscillatable into alignment with said chute, so that the lowermost rivet in the chute will drop thereon, said member forcing said rivet into the magazine on the next forward oscillation, and a stop for holding all rivets above the lowermost in the chute while the segment is turned to alignment therewith, said stop being withdrawn on the next forward oscillation of the segment.

12. Mechanism for feeding rivets and the like comprising a chute, a magazine adapted to hold a series of rivets in side by side relation, a rocking member having a segment normally closing the lower end of said chute, said segment having a radial face oscillatable into alignment with said chute, so that the lowermost rivet in the chute will drop thereon, said member forcing said rivet into the magazine on the next forward oscillation, and a stop operable by said segment for holding all rivets above the lowermost in the chute while the segment is turned to alignment therewith, said stop being withdrawn on the next forward oscillation of the segment.

JOHN DLESK.